US008731380B1

(12) United States Patent  
Ho et al.

(10) Patent No.: US 8,731,380 B1
(45) Date of Patent: May 20, 2014

(54) METHOD AND SYSTEM TO RECORD ONTO A MEDIA PLAYER

(75) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 2032 days.

(21) Appl. No.: 11/644,569

(22) Filed: Dec. 21, 2006

(51) Int. Cl.
*H04N 5/92* (2006.01)
*H04N 5/765* (2006.01)
*H04N 21/845* (2011.01)

(52) U.S. Cl.
CPC .................................. *H04N 21/8453* (2013.01)
USPC ........................................... 386/326; 386/200

(58) Field of Classification Search
CPC ............................... H04N 7/16; H04N 21/8453
See application file for complete search history.

(56) References Cited

U.S. PATENT DOCUMENTS

| | | | | |
|---|---|---|---|---|
| 2004/0133914 | A1* | 7/2004 | Smith et al. | 725/86 |
| 2005/0278257 | A1* | 12/2005 | Barr et al. | 705/57 |
| 2007/0132660 | A1* | 6/2007 | Nuttall | 345/2.3 |
| 2007/0210162 | A1* | 9/2007 | Keen et al. | 235/451 |
| 2007/0261112 | A1* | 11/2007 | Todd et al. | 726/11 |
| 2008/0235476 | A1* | 9/2008 | Goodman et al. | 711/163 |
| 2010/0205280 | A1* | 8/2010 | Bell et al. | 709/219 |

* cited by examiner

*Primary Examiner* — William C Vaughn, Jr.
*Assistant Examiner* — Asher Khan
(74) *Attorney, Agent, or Firm* — North Shore Patents, P.C.; Michele Liu Baillie

(57) ABSTRACT

A method and system for recording a media content onto a media player are disclosed. A recording interface of the media player is unlocked by a media recorder using a key. Next, the media player receives the media content from the media recorder through the recording interface. The media content is stored onto a storage of the media player, where the storage resides within the media player prior to receiving the media content from the media recorder. The media player includes a mechanism for playing the media content. Then, the recording interface of the media player is locked by the media recorder. In this manner, a way is provided to distribute media content while also protecting against the improper copying of media content.

19 Claims, 5 Drawing Sheets

METHOD AND SYSTEM TO RECORD ONTO A MEDIA PLAYER

CROSS REFERENCE TO RELATED APPLICATIONS

This application is related to co-pending U.S. patent application Ser. No. 11/595,362, entitled "Method and System for Play-Only Media Player", filed on Nov. 9, 2006.

BACKGROUND

1. Field

This invention relates generally to media, particularly to a system and method to record media content onto a media player.

2. Related Arts

Digitization of pictures, music and movies brings convenience to the entertainment and media industry. Digital media has proven to be a highly efficient and effective distribution mechanism. For example, digital music download, music ripping and music CD burning by consumers are common.

The ease of media distribution leads to major unintended business implications, especially in illegal copying of media content. Examples include illegal music download through peer-to-peer copying mechanisms like Napster™, or Kazaa™. Or more frequently, a consumer copies downloaded music in MP3 format to CD's and MP3 players. In one example, John is a high school student. He, on Tuesday, purchased and downloaded last week's top 10 pop songs. He burned a music CD for his desktop music system with the songs. In addition, he ripped the songs to his iPod™, his sisters' MP3 players, and his father's home media center. After John talked to his friends in the school, John copied the files to his classmates' MP3 players.

Several security mechanisms are being introduced to address the problem. They are mainly related to digital right management (DRM), where a signature is put into a media file, and a user is given a key. A media player would be able to play the media file only after the user presents the key. Often times, the key is given to the media player so that the media player can play the media file while other media players cannot play the media file. Although such security mechanisms partially solve the copying problem, they are very inconvenient to users. As in the above example, John downloaded to his PC the songs with DRM protection. In one embodiment, the key was given to John's PC. John was able to listen to the songs. After John ripped the songs to his iPod, he cannot play the songs with his iPod. Over a weekend, John's buys a new PC and transfers the songs to the new PC. John cannot play the songs on the new PC as the new PC does not have the key.

The above illustrates a need for a way to distribute media content and to protect against improper copying of media content, and therefore a need for a solution to record media content under protected condition.

SUMMARY

A method and system for recording a media content onto a media player are disclosed. A recording interface of the media player is unlocked by a media recorder using a key. Next, the media player receives the media content from the media recorder through the recording interface. The media content is stored onto a storage of the media player, where the storage resides within the media player prior to receiving the media content from the media recorder. The media player includes a mechanism for playing the media content. Then, the recording interface of the media player is locked by the media recorder. In this manner, a way is provided to distribute media content while also protecting against the improper copying of media content.

DETAILED DESCRIPTION

Figure 1:
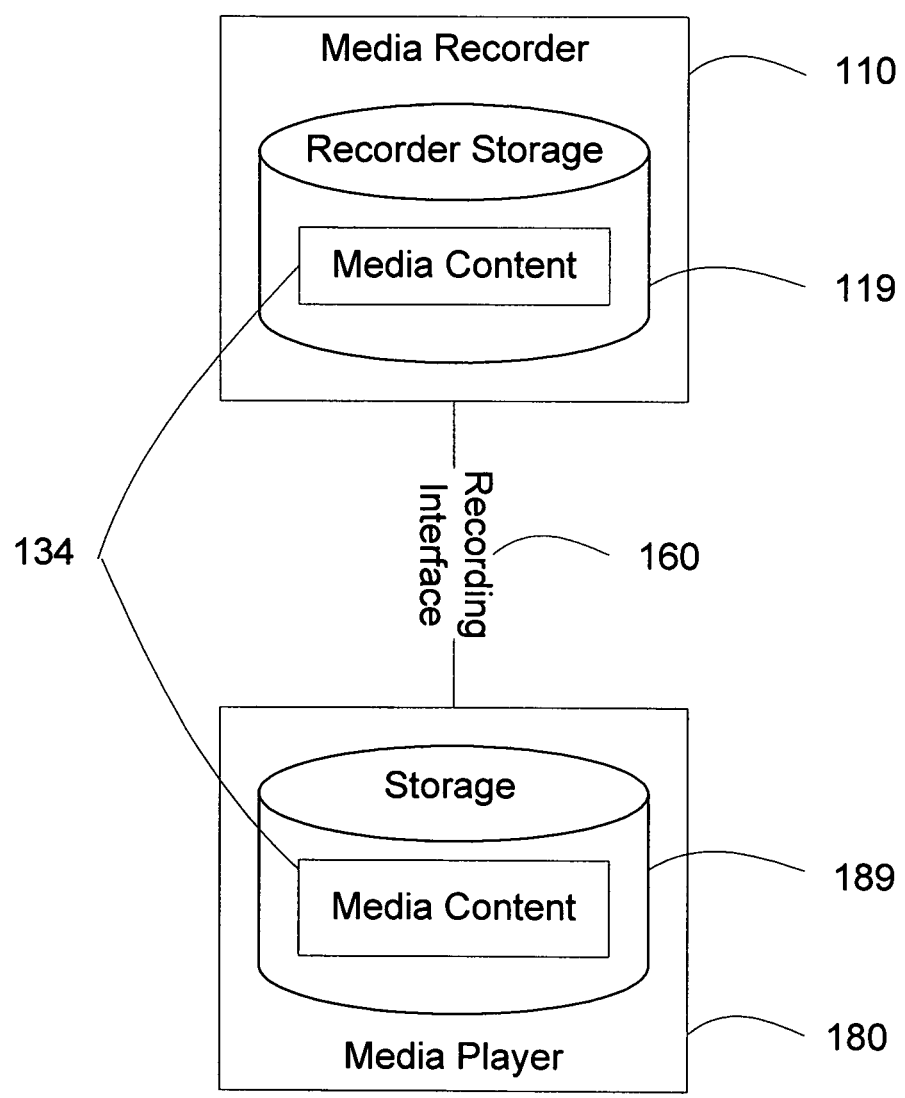
FIG. 1 illustrates a media recorder.

FIG. 1 illustrates a media recorder. Media recorder 110 records media content 134 onto media player 180 in a protected condition.

In one embodiment, media content 134 includes audio media content such as a song, an audio recording, a music concert recording, a talk show or an interview recording. In one embodiment, media content 134 includes a music album. In one embodiment, media content 134 includes a video media content such as a movie, a video recording such as a television program, a concert or a theatrical play recording, a music television (MTV), a short film, a cooking, exercise or self-improvement instructional program, a documentary, a comic performance, or a lecture recording. In one embodiment, media content 134 comprises a live concert, a studio recording session, a sports event, or a live interview. In one embodiment, media content 134 comprises a broadcast program, such as a television or radio program.

In one embodiment, media content 134 includes an audio media file such as a Moving Picture Experts Group-1 Audio Layer 3 (MP3) file, a Windows Media Audio (WMA) file, or an Advanced Audio Coding (AAC) file. In one embodiment, media content 134 includes a video/audio file such as a Windows Media Video File (WMV), a Moving Picture Experts Group-4 (MPEG-4) file or an Audio Video Interleave (AVI) file. In one embodiment, media content 134 includes a collection of media files.

Media player 180 includes a non-removable storage 189, such as flash memory or hard disk. Media recorder 110 records media content 134 onto storage 189. The storage 189 resides within the media player 180 prior to recording of the media content 134 onto storage 189. Media player 180 includes the functionality of playing media content 134. In one embodiment, media player 180 includes a speaker for playing audio media content in media content 134. In one embodiment, media player 180 includes a graphical display screen for playing video media content in media content 134. In one embodiment, media player 180 includes user control function, such as a plurality of keys that allow a user to control the playing of media content 134. In one embodiment, the user control function allows a user to select, skip, pause or resume audio media content; or to turn up/down the volume. In one embodiment, the user control function allows a user to select, rewind, or fast-forward video media content; or to adjust the contrast or color tone.

The media player 180 is described further in Appendix A. As described in Appendix A, media player 180 includes a mechanism for playing the media content 134.

In one embodiment, media player 180 allows media recorder 110 to record media content 134 only once.

Media recorder 110 communicates to media player 180 using a recording interface 160. Media recorder 110 records media content 134 onto media player 180 over recording interface 160. In one embodiment, recording interface 160 includes a data interface, such as a Universal Serial Bus (USB) interface. In one embodiment, recording interface 160 includes an audio jack, an RCA jack, a component video interface, a composite video interface, or an S-Video interface. In one embodiment, recording interface 160 includes a High-Definition Multimedia Interface (HDMI) interface, or a High-Bandwidth Digital Content Protection (HDCP) interface. In one embodiment, recording interface 160 includes a network interface, such as an Ethernet interface. In one embodiment, recording interface 160 includes a communication session between media recorder 110 and media player 180.

In one embodiment, recording interface 160 includes a mechanical lock which is unlocked during recording of media content 134.

In one embodiment, media recorder 110 includes recorder storage 119. Recorder storage 119 includes information that comprises media content 134. In one embodiment, recorder storage 119 includes media content 134. In one embodiment, recorder storage 119 includes flash memory or hard disk. In one embodiment, recorder storage 119 includes removable media such as a secure digital (SD) memory card, compact disk (CD) or DVD. In one embodiment, recorder storage 119 includes a USB based flash memory drive.

In one embodiment, media recorder 110 connects to one or more capturing devices such as microphone or video camera that capture audio or video signals in a live performance setting. Media recorder 110 processes or combines the signals into information that comprises media content 134.

In one embodiment, media recorder 110 includes a receiver, such as radio receiver or television receiver to receive a broadcast program.

Figure 2:
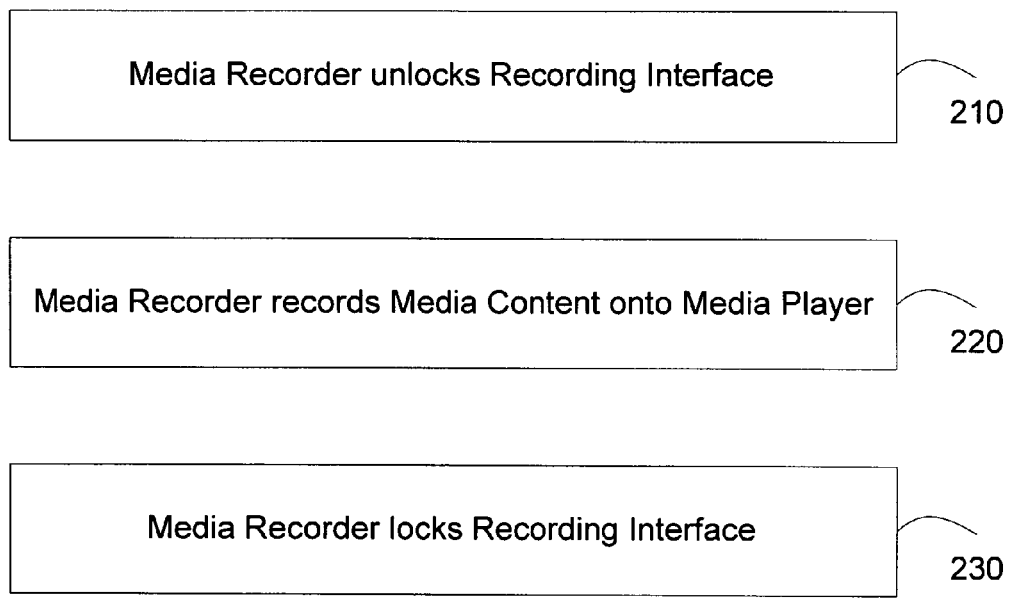
FIG. 2 illustrates a recording process.

FIG. 2 illustrates a recording process.

The recording process includes steps 210, 220, and 230.

Figure 3:
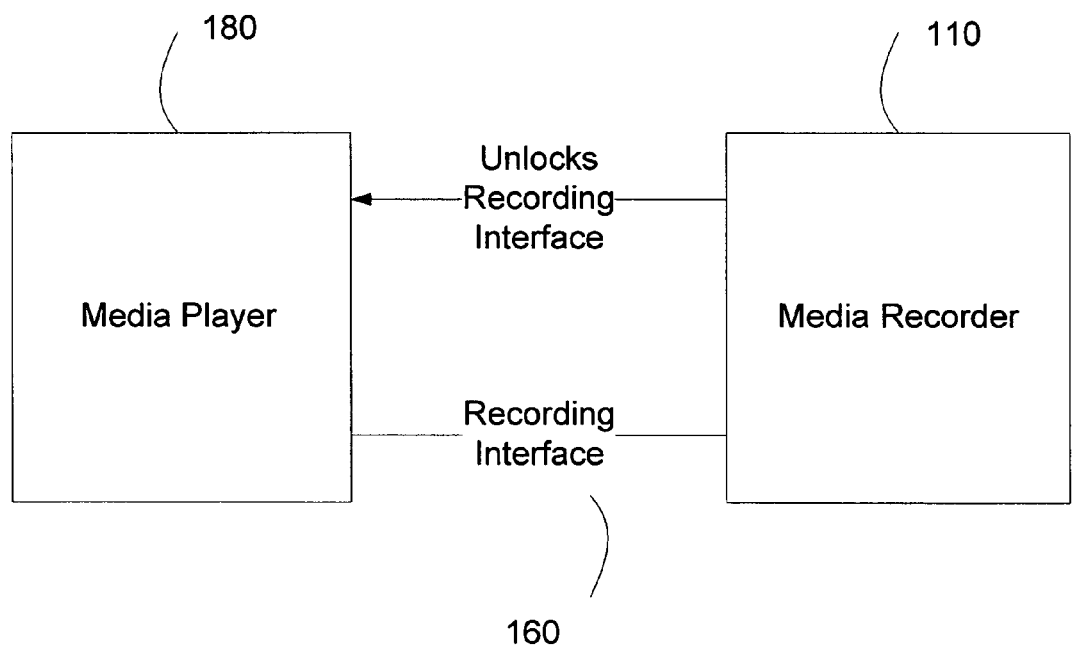
FIG. 3 illustrates the media recorder unlocking the recording interface.

In step 210 as illustrated in FIG. 3, media recorder 110 unlocks recording interface 160. In one embodiment, recording interface 160 includes a communication session. Media recorder 110 sends a recording request to media player 180 over the communication session, wherein the recording request includes an authentication identity such as a password or an alpha-numeric code. In one embodiment, media player 180 authenticates the identity, allows the media recorder 110 to connect to the recording interface 160, and proceeds to step 220. In a different embodiment, media recorder 110 uses a two-factor authentication (T-FA). In one embodiment, media recorder 110 includes an identity and an operator provides a personal identification number (PIN) to media recorder 110. Media recorder 110 includes the identity and the PIN in the recording request. In one embodiment, the operator provides biometric information to media recorder 110.

In one embodiment, media player 180 includes a mechanical lock and media recorder 110 includes a mechanical key. Media recorder 110 unlocks recording interface 160 by engaging the mechanical key with the mechanical lock. Media recorder 110 then connects to the recording interface 160 of the media player 180 and proceeds to step 220. In one embodiment, the mechanical lock includes an electromagnet; wherein the engagement of the key and the mechanical lock causes an electrical current to pass through the electromagnet, resulting in the connection of media recorder 110 and media player 180. In another embodiment, the mechanical lock includes a solenoid bolt. In one other embodiment, the mechanical lock includes a normally-open electrical relay that connects media recorder 110 and media player 180 when activated by an electrical current. In one embodiment, the mechanical lock includes an electric motor that moves a piece of conductor to connect media recorder 110 and media player 180. In one embodiment, the mechanical lock includes a spring-loaded latch. In one embodiment, in released or unloaded position, the latch closes the physical opening of recording interface 160. The engagement of the key and the mechanical lock loads the spring, causing the latch to open the physical opening of recording interface 160, allowing media recorder 110 to connect to media player 180.

In one embodiment, recording interface 160 includes a combination of a mechanical lock and a communication session. Media recorder 110 provides an authentication key or identity to media player 180. In one embodiment, media player 180 authenticates the authentication key or identity and allows media recorder 110 to establish a communication session with media player 180. Media recorder 110 proceeds to step 220.

Figure 4:
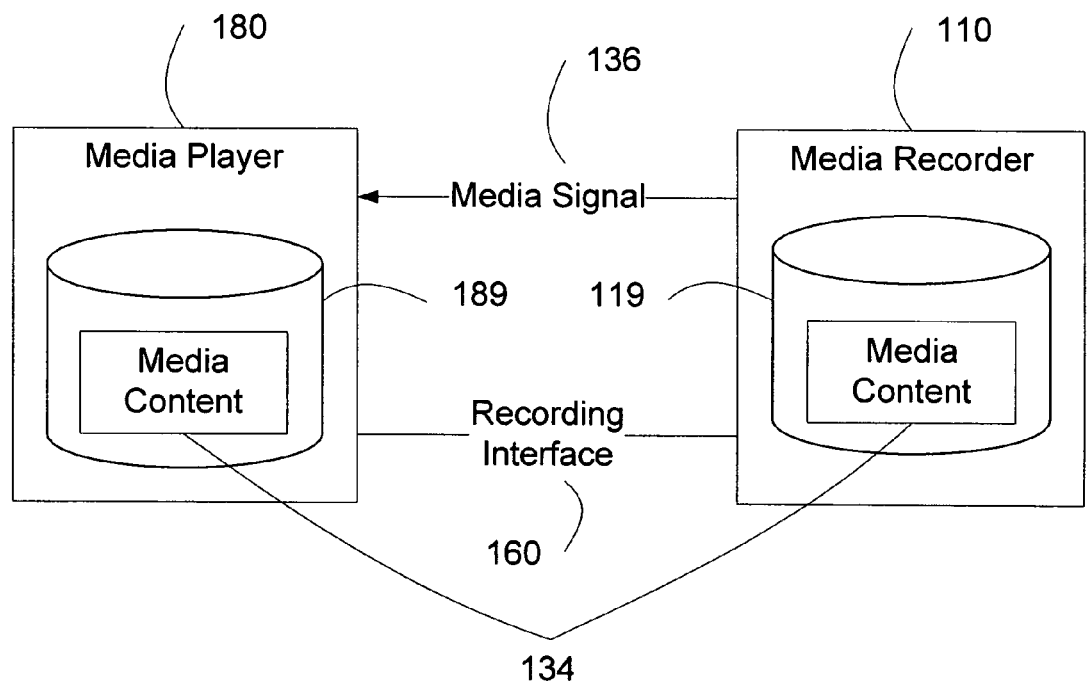
FIG. 4 illustrates the media recorder transferring a plurality of media signals to the media player using the recording interface.

In step 220 as illustrates in FIG. 4, media recorder 110 transfers a plurality of media signals 136 to media player 180 using recording interface 160. The plurality of media signals 136 comprises media content 134. In one embodiment, the plurality of media signals 136 are monophonic or stereophonic analog audio signals. In one embodiment, the plurality of media signals 136 are digital audio signals, such as Pulse Code Modulation (PCM) digital audio signals in 8 kHz 8-bit monophonic, 8 kHz 16-bit stereophonic, or 44.1 kHz 16-bit stereophonic format. In one embodiment, the plurality of media signals 136 are in a compressed codec format such as G723.1. In one embodiment, the plurality of media signals 136 are in MP3 frame format also known as MP3 digital format. In one embodiment, the plurality of media signals 136 are analog video signals in National Television System Committee (NTSC) or phase-alternating line (PAL) format. In one embodiment, the plurality of media signals 136 are digital video signals, such as MPEG-4, WMV or Society of Motion Picture and Television Engineers (SMPTE) format.

Media player 180 receives the plurality of media signals 136 and converts the plurality of media signals 136 into media content 134.

In one embodiment, media content 134 includes a computer file object. Media recorder 110 transfers media content 134 by performing a file transfer and media signals 136 includes portion of media content 134 file object.

After media recorder 110 completes step 220, media recorder 110 performs step 230.

Figure 5:
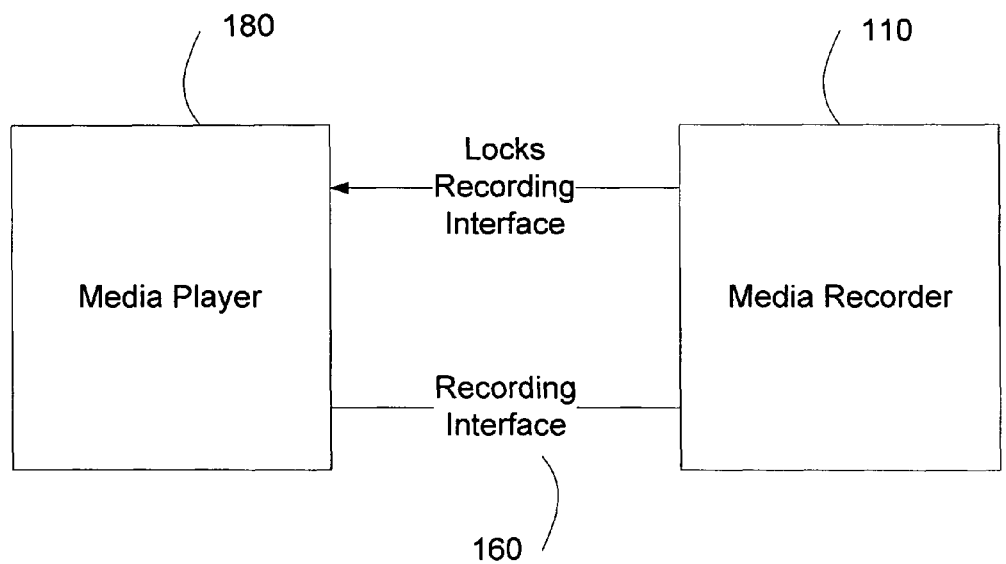
FIG. 5 illustrates the media recorder locking the recording interface.

In step 230 as illustrated in FIG. 5, media recorder 110 locks recording interface 160.

In one embodiment, media recorder 110 sends a lock request to media player 180 over the communication session. Media player 180 receives the lock request and disconnect media player 180 from media recorder 110. Media player 180 does not accept media signals 136 after the disconnection. In one embodiment, the lock request includes an authentication identity and media player 180 authenticates the identity before disconnecting media player 180 from media recorder 110.

In one embodiment, media recorder 110 locks recording interface 160 by disengaging the mechanical key from the mechanical lock. In one embodiment, the disengagement stops the electrical current that passes through the electromagnet of the mechanical lock, disconnecting media recorder 110 and media player 180. In one embodiment, the disengagement causes the normally-open electric relay to return to the open position resulting in the disconnection of media recorder 110 and media player 180. In one embodiment, the disengagement causes the spring-loaded latch to return to released or unloaded position that closes the physical opening of recording interface 160.

In one embodiment, the locking of recording interface 160 is permanent, wherein media player 180 does not respond to subsequent unlocking attempts from media recorder 110.

In one embodiment, media player 180 is for rental purpose. After a customer returns media player 180, in one embodiment, media recorder 110 records new media content 134 onto media player 180. In one embodiment, media recorder 110 uses a different key to record the new media content 134.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method for recording a media content onto a media player, comprising:
   (a) unlocking a hardware recording interface of the media player by a media recorder using a key;
   (b) connecting the media recorder with the hardware recording interface;
   (c) sending the media content to the media player from the media recorder over the connection to the hardware recording interface, wherein the media content is stored onto a non-removable storage of the media player, wherein the storage resides within the media player prior to sending the media content from the media recorder, wherein the media player comprises a mechanism for playing the media content;
   (d) after completion of the sending of the media content, sending a lock request to the media player by the media recorder; and
   (e) in response to the lock request, disconnecting the media recorder from the hardware recording interface by the media player, wherein the disconnecting of the media recorder from the hardware recording interface causes permanent locking of the hardware recording interface of the media player by the media recorder, wherein the hardware recording interface does not respond to any subsequent unlocking attempts from the media recorder.

2. The method of claim 1, wherein the key comprises an authentication identity for the media recorder, wherein the unlocking (a) comprises:
   (a1) sending a recording request to the media player from the media recorder, wherein the recording request comprises the authentication identity, wherein the media player authenticates the authentication identity.

3. The method of claim 1, wherein the key comprises an authentication identity of the media recorder and a personal identification number for an operator, wherein the unlocking (a) comprises:
   (a1) sending a recording request to the media player from the media recorder, wherein the recording request comprises the authentication identity, wherein the media player receives the personal identification number from the operator, and authenticates the authentication identity and the personal identification number by the media player.

4. The method of claim 1, wherein the media player comprises a mechanical lock, wherein the media recorder comprises a mechanical key, wherein the unlocking (a) comprises:
   (a1) unlocking the hardware recording interface of the media player by engaging the mechanical key of the media recorder with the mechanical lock of the media player.

5. The method of claim 1, wherein the sending (c) comprises:
   (c1) transferring a plurality of media signals from the media recorder to the media player over the connection to the hardware recording interface, wherein the media player converts the plurality of media signals into the media content.

6. The method of claim 1, wherein the media player comprises a mechanical lock, wherein the media recorder comprises a mechanical key, wherein the locking (e) comprises:
   (e1) in response to the lock request, disengaging the mechanical key of the media recorder from the mechanical lock of the media player, wherein the disengagement of the mechanical key of the media recorder from the mechanical lock of the media player causes the permanent locking of the hardware recording interface of the media player, wherein the hardware recording interface does not respond to any subsequent unlocking attempts from the media recorder.

7. The method of claim 1, wherein the media recorder comprises a mechanical key, wherein the media player comprises a mechanical lock comprising an electromagnet, wherein the unlocking (a) and the disconnecting (e) comprises:
   (a1) unlocking the hardware recording interface of the media player by the media recorder by engaging the key of the media recorder with the mechanical lock of the media player, wherein the engagement of the mechanical key with the mechanical lock causes an electrical current to pass through the electromagnet of the mechanical lock; and
   (e1) in response to the lock request, disengaging the mechanical key of the media recorder from the mechanical lock of the media player, wherein the disengagement of the mechanical key from the mechanical lock causes the electrical current to permanently stop passing through the electromagnet of the mechanical lock, wherein the permanently stopping the passing of the electrical current through the electromagnet of the mechanical lock causes the permanent locking of the hardware recording interface of the media player, wherein the hardware recording interface does not respond to any subsequent unlocking attempts from the media recorder.

8. The method of claim 1, wherein the media player comprises a mechanical lock comprising an electrical relay, wherein the unlocking (a) and the disconnecting (e) comprises:
   (a1) unlocking the hardware recording interface of the media player by the media recorder by activating an electrical current through the electrical relay of the mechanical lock of the media player; and
   (e1) in response to the lock request, permanently deactivating the electrical current from the electrical relay, wherein the permanent deactivating of the electrical current from the electrical relay causes the permanent locking of the hardware recording interface of the media player, wherein the hardware recording interface does not respond to any subsequent unlocking attempts from the media recorder.

9. The method of claim 1, wherein the media recorder comprises a mechanical key, wherein the media player comprises a mechanical lock comprising a spring-loaded latch, wherein the unlocking (a) and the disconnecting (e) comprises:

(a1) unlocking the hardware recording interface of the media player by the media recorder by engaging the key of the media recorder with the mechanical lock of the media player, wherein the engagement of the mechanical key with the mechanical lock causes the mechanical lock to load the latch, wherein the loading of the latch causes an opening of a physical opening of the recording interface; and (e1) in response to the lock request, disengaging the mechanical key of the media recorder from the mechanical lock of the media player, wherein the disengagement of the mechanical key from the mechanical lock causes the latch to permanently return to an unloaded position, wherein the permanent return of the latch to the unloaded position causes the permanent locking of the hardware recording interface of the media player, wherein the hardware recording interface does not respond to any subsequent unlocking attempts from the media recorder.

10. A media recorder, comprising:
a storage comprising a media content; and
a key for engaging a mechanical lock of a media player to unlock, a hardware recording interface of the media player, wherein the media recorder connects to the hardware recording interface after the unlocking of the hardware recording interface, wherein the media content is sent to the media player over the connection to the hardware recording interface for storage onto a non-removable storage of the media player,
wherein after completing the sending of the media content, the key of the media recorder is disengaged from the mechanical lock of the media player, wherein the disengagement of the key of the media recorder from the mechanical lock of the media player causes a permanent locking of the hardware recording interface of the media player, wherein the hardware recording interface does not respond to any subsequent unlocking attempts from the media recorder.

11. The media recorder of claim 10, wherein the media recorder connects to one or more capturing devices wherein the media content is received over the connection and through the capturing devices.

12. The media recorder of claim 10, wherein the key comprises an authentication identity for the media recorder, wherein the media recorder:
sends a recording request to the media player, wherein the recording request comprises the authentication identity, wherein the media player authenticates the authentication identity.

13. The media recorder of claim 10, wherein the key comprises an authentication identity of the media recorder and a personal identification number for an operator, wherein the media recorder:
sends a recording request to the media player, wherein the recording request comprises the authentication identity, wherein the media player receives the personal identification number from the operator and authenticates the authentication identity and the personal identification number.

14. The media recorder of claim 10, wherein the media player comprises a mechanical key, wherein the engagement of the mechanical key with the mechanical lock of the media player unlocks the hardware recording interface of the media player.

15. The media recorder of claim 10, wherein the media recorder:
transfers a plurality of media signals to the media player over the connection to the hardware recording interface, wherein the media player converts the plurality of media signals into the media content.

16. The media recorder of claim 10, wherein the key of the media recorder comprises a mechanical key, wherein the mechanical lock of the media player comprises an electromagnet,
wherein mechanical key of the media recorder engages with the mechanical lock of the media player, wherein the engagement of the mechanical key with the mechanical lock causes an electrical current to pass through the electromagnet of the mechanical lock,
wherein after completing the sending of the media content, the mechanical key of the media recorder is disengaged from the mechanical lock of the media player, wherein the disengagement of the mechanical key from the mechanical lock causes the electrical current to permanently stop passing through the electromagnet of the mechanical lock, wherein the permanently stopping the passing of the electrical current through the electromagnet of the mechanical lock causes the permanent locking of the hardware recording interface of the media player, wherein the hardware recording interface does not respond to any subsequent unlocking attempts from the media recorder.

17. The media recorder of claim 10, wherein the media player comprises a mechanical lock comprising an electrical relay,
wherein the key of the media recorder unlocks the hardware recording interface of the media player by the media recorder by activating an electrical current through the electrical relay of the mechanical lock of the media player,
wherein after completing the sending of the media content, the key of the media recorder is disengaged from the mechanical lock of the media player by permanently deactivating the electrical current from the electrical relay, wherein the permanent deactivating of the electrical current from the electrical relay causes the permanent locking of the hardware recording interface of the media player, wherein the hardware recording interface does not respond to any subsequent unlocking attempts from the media recorder.

18. The media recorder of claim 10, wherein the key of the media recorder comprises a mechanical key, wherein the mechanical lock of the media player comprises a spring-loaded latch,
wherein the mechanical key of the media recorder engages with the mechanical lock of the media player, wherein the engagement of the mechanical key with the mechanical lock causes the mechanical lock to load the latch, wherein the loading of the latch causes an opening of a physical opening of the recording interface,
wherein after completing the sending of the media content, the mechanical key of the media recorder is disengaged from the mechanical lock of the media player, wherein the disengagement of the mechanical key from the mechanical lock causes the latch to permanently return to an unloaded position, wherein the permanent return of the latch to the unloaded position causes the permanent locking of the hardware recording interface of the media player, wherein the hardware recording interface does not respond to any subsequent unlocking attempts from the media recorder.

19. A system, comprising:

a media player comprising a non-removable storage, a mechanical lock, a hardware recording interface, and a mechanism for playing media content stored in the non-removable storage; and a media recorder comprising a storage comprising a media content and a key for engaging the mechanical lock of the media player for unlocking the hardware recording interface of the media player, wherein the media recorder connects to the hardware recording interface after the unlocking of the hardware recording interface, wherein the media content is sent to the media player over the connection to the hardware recording interface for storage onto the non-removable storage of the media player, wherein the non-removable storage resides within the media player prior to receiving the media content from the media recorder, wherein after completing the sending of the media content, the key of the media recorder is disengaged from the mechanical lock of the media player, wherein the disengagement of the key of the media recorder from the mechanical lock of the media player causes a permanent locking of the hardware recording interface of the media player, wherein the hardware recording interface does not respond to any subsequent unlocking attempts form the media recorder.

* * * * *